United States Patent
Lai et al.

(10) Patent No.: US 10,469,848 B2
(45) Date of Patent: Nov. 5, 2019

(54) PALETTE PREDICTION AND SHARING IN VIDEO CODING

(71) Applicant: HFI Innovation Inc., Zhubei, Hsinchu County (TW)

(72) Inventors: Wang-Lin Lai, San Jose, CA (US); Shan Liu, San Jose, CA (US); Tzu-Der Chuang, Zhubei (TW); Xiaozhong Xu, Fremont, CA (US); Jing Ye, San Jose, CA (US)

(73) Assignee: HFI Innovation Inc., Zhubei, Hsinchu County (TW)

( * ) Notice: Subject to any disclaimer, the term of this patent is extended or adjusted under 35 U.S.C. 154(b) by 80 days.

(21) Appl. No.: 15/104,654

(22) PCT Filed: Dec. 5, 2014

(86) PCT No.: PCT/US2014/068725
§ 371 (c)(1),
(2) Date: Jun. 15, 2016

(87) PCT Pub. No.: WO2015/094711
PCT Pub. Date: Jun. 25, 2015

(65) Prior Publication Data
US 2016/0316213 A1    Oct. 27, 2016

Related U.S. Application Data

(60) Provisional application No. 61/923,378, filed on Jan. 3, 2014, provisional application No. 61/917,474, filed on Dec. 18, 2013.

(51) Int. Cl.
*H04N 19/186* (2014.01)
*H04N 19/115* (2014.01)
(Continued)

(52) U.S. Cl.
CPC ......... *H04N 19/186* (2014.11); *H04N 19/115* (2014.11); *H04N 19/167* (2014.11);
(Continued)

(58) Field of Classification Search
CPC .. H04N 19/105; H04N 19/115; H04N 19/157; H04N 19/167; H04N 19/176;
(Continued)

(56) References Cited

U.S. PATENT DOCUMENTS 5,065,144 A * 11/1991 Edelson ............... G09G 5/026
                                                                        345/530
5,684,716 A      11/1997 Freeman
(Continued)

FOREIGN PATENT DOCUMENTS

CA        2 913 615 A1     7/2013

OTHER PUBLICATIONS

RCE3: Results of Test 3.1 on Palette Mode for Screen Content Coding Guo L et al. JCT-VC meeting; Jul. 25, 2013-Aug. 2, 2013; Vienna; (Joint Collaborative Team on Video Coding of ISO/IEC JTC1/SC29/WG11 and ITU-T SG.16 ).*
(Continued)

*Primary Examiner* — Mohammed S Rahaman
(74) *Attorney, Agent, or Firm* — Oblon, McClelland, Maier & Neustadt, L.L.P.

(57) ABSTRACT

A method and apparatus for palette prediction and sharing according to the present invention are disclosed. A method incorporating an embodiment of the present invention determines one or more palette sharing flags for the current block. A set of current palettes corresponding to the set of color components is generated according to the palette sharing flags. If a first palette sharing flag is asserted, one or more current palettes indicated by the first palette sharing flag are copied entirely from one or more reference palettes of a set
(Continued)

of reference palettes. If the first palette sharing flag is not asserted, one or more current palettes indicated by the first palette sharing flag are derived from a bitstream associated with the video data. Encoding or decoding is then applied to the current block according to the set of current palettes.

21 Claims, 1 Drawing Sheet

(51) Int. Cl.
| | |
|---|---|
| H04N 19/167 | (2014.01) |
| H04N 19/70 | (2014.01) |
| H04N 19/593 | (2014.01) |
| H04N 19/463 | (2014.01) |
| H04N 19/176 | (2014.01) |
| H04N 19/105 | (2014.01) |
| H04N 19/157 | (2014.01) |

(52) U.S. Cl.
CPC ......... *H04N 19/463* (2014.11); *H04N 19/593* (2014.11); *H04N 19/70* (2014.11); *H04N 19/105* (2014.11); *H04N 19/157* (2014.11); *H04N 19/176* (2014.11)

(58) Field of Classification Search
CPC .. H04N 19/186; H04N 19/463; H04N 19/593; H04N 19/70
USPC .................................................... 375/240.12
See application file for complete search history.

(56) References Cited

U.S. PATENT DOCUMENTS

| | | |
|---|---|---|
| 2004/0179731 A1 | 9/2004 | Ono et al. |
| 2006/0204086 A1 | 9/2006 | Gargi |
| 2010/0046628 A1* | 2/2010 | Bhaskaran ........... H04N 19/103 375/240.24 |
| 2013/0195199 A1 | 8/2013 | Guo et al. |
| 2014/0301475 A1* | 10/2014 | Guo ...................... H04N 19/50 375/240.24 |
| 2015/0016501 A1* | 1/2015 | Guo .......................... G06T 9/00 375/240.02 |

OTHER PUBLICATIONS

Guo, X., et al.; "AHG8: Major-color-based screen content coding;" Sep. 2016; pp. 1-8.
Zhu, W., et al.; "Template-based palette prediction;" Joint Collaborative Team on Video Coding (JCT-VC) of ITU-T SG 16 WP 3 and ISO/IEC JTC 1/SC 29/WG 11; Apr. 2013; pp. 1-7.
Guo, L, et al.; "Palette Mode for Screen Content Coding;" Joint Collaborative Team on Video Coding (JCT-VC) of ITU-T SG 16 WP 3 and ISO/IEC JTC 1/SC 29/WG 11; Apr. 2013; pp. 1-5.
International Search Report dated Mar. 3, 2015, issued in application No. PCT/US14/68725.
Guo, L., et al.; "RCE3: Results of Test 3.1 on Palette Mode for Screen Content Coding;" Joint Collaborative Team on Video Coding (JCT-VC) of ITU-T SG 16 WP 3 and ISO/IEC JTC 1/SC 29/WG 11; Aug. 2013; pp. 1-12.

\* cited by examiner

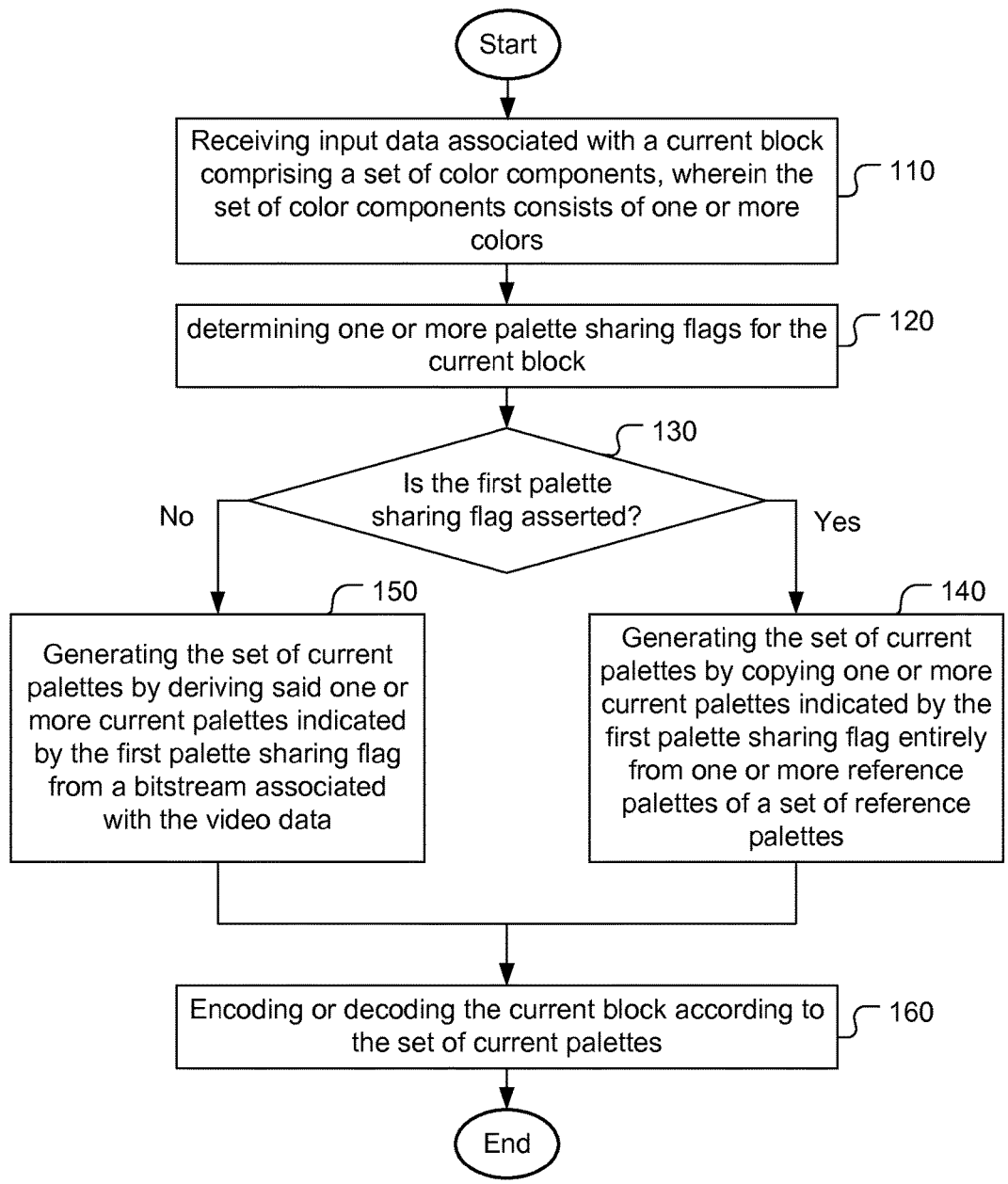

PALETTE PREDICTION AND SHARING IN VIDEO CODING

CROSS REFERENCE TO RELATED APPLICATIONS

The present invention claims priority to U.S. Provisional Patent Application, Ser. No. 61/917,474, filed on Dec. 18, 2013, entitled "Methods and Apparatus for Palette Prediction and Sharing in Major Color Based Coding in Video Compression" and U.S. Provisional Patent Application, Ser. No. 61/923,378, filed on Jan. 3, 2014, entitled "Methods and Apparatus of Syntax and Processes for Palette Prediction and Sharing in Video Compression". The U.S. Provisional Patent Applications are hereby incorporated by reference in their entireties.

FIELD OF THE INVENTION

The present invention relates to palette coding for video data that may contain color contents with limited colors in some areas. In particular, the present invention relates to techniques to improve the performance by developing more efficient palette sharing.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include range extensions (RExt) which target at non-4:2:0 color formats, such as 4:2:2 and 4:4:4, and higher bit-depths video such as 12, 14 and 16 bits per sample. One of the likely applications utilizing RExt is screen sharing, over wired- or wireless-connection. Due to specific characteristics of screen contents, coding tools have been developed and demonstrate significant gains in coding efficiency. Among them, the palette coding (a.k.a. major color based coding) techniques represent block of pixels using indices to the palette (major colors), and encode the palette and the indices by exploiting spatial redundancy. While the total number of possible color combinations is huge, the number of colors in an area of picture is usually very limited for typical screen contents. Therefore, the palette coding becomes very effective for screen content materials.

During the early development of HEVC range extensions (RExt), several proposals have been disclosed to address palette-based coding. For example, a palette prediction and sharing technique is disclosed in JCTVC-N0247 (Guo et al., "*RCE3: Results of Test 3.1 on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 July-2 Aug. 2013 Document: JCTVC-N0247). In JCTVC-N0247, the palette of each color component is constructed and transmitted. The palette can be predicted (or shared) from its left neighboring CU to reduce the bitrate. A pseudo code for the method disclosed in JCTVC-N0247 is shown as follows.

```
For (color_index)
    If (palette_pred[color_index])
        Current CU palette[color_index] = left CU palette[color_index]
    Else
        Parse syntax for the palette[color_index] of the current CU
    End
End
```

As shown in the pseudo code above, when the palette prediction mode is used as indicated by palette_pred[color_index], the palette for the current coding unit having color_index (i.e., Current CU palette[color_index]) is shared from the palette of the CU having the same color_index at the left side of the current CU (i.e., left CU palette[color_index]). Otherwise, a new palette is parsed from the bitstream at the decoder side or signaled in the bitstream at the encoder side. The method according to JCTVC-N0247 does not use palette prediction (sharing) from the above CU. Furthermore, if the left CU is not coded using palette mode, the palette for the current CU cannot be predicted from the left CU.

Another palette coding method is disclosed in JCTVC-N0249 (Guo et al., "non-RCE3: Modified Palette Mode for Screen Content Coding", Joint Collaborative Team on Video Coding (JCT-VC) of ITU-T SG 16 WP 3 and ISO/IEC JTC 1/SC 29/WG 11, 14th Meeting: Vienna, AT, 25 July-2 Aug. 2013 Document: JCTVC-N0249). In JCTVC-N0249, each element in the palette is a triplet, representing a specific combination of the three color components.

Yet another palette coding is disclosed in JCTVC-O0182 (Guo et al., "*AHG8. Major-color-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). In JCTVC-O0182, each component is constructed and transmitted. However, instead of predicting the entire palette from the left CU, individual entry in a palette can be predicted from the exact corresponding palette entry in the above CU or left CU. A pseudo code for the method disclosed in JCTVC-O0182 is shown as follows.

```
For (color_index)
    Parse syntax num_major_color[color_index]
    For (n <= num_major_color[color_index])
        If (palette_pred[color_index][n])
            If (pred_from_above[color_index][n])
                Current CU palette[color_index][n] = Above CU palette[color_index][n]
            Else
                Current CU palette[color_index][n] = Left CU palette[color_index][n]
            End
        Else
            Parse syntax for current CU palette[color_index][n]
        End
    End
End
```

As shown in the above pseudo code, the individual entry n of the palette for the current CU (i.e., Current CU palette[color_index][n] for order position n) may be shared from the corresponding palette entry of the above CU (i.e., Above CU palette[color_index][n]) or the left CU (i.e., Left CU palette[color_index][n]) when palette prediction is selected as indicated by palette_pred[color_index][n] being 1. If the palette prediction is not used as indicated by palette_pred[color_index][n] being 0, the palette for the current CU is parsed from the bitstream (i.e., Parse syntax for current CU palette[color_index][n]) at the decoder side or signaled in the bitstream at the encoder side.

As shown above, the palette coding according to JCTVC-O0182 uses element-by-element (or entry-by-entry) predictive coding. Therefore, the parsing complexity (multiple levels) becomes high. Furthermore, it may not be very efficient since palette elements (palette entries) in adjacent CUs might not be at same order position n, even if they have the same value.

Therefore, it is desirable to develop methods for further improving the coding efficiency and/or reducing the complexity associated with the palette coding.

BRIEF SUMMARY OF THE INVENTION

A method and apparatus for palette prediction and sharing according to the present invention are disclosed. A method incorporating an embodiment of the present invention determines one or more palette sharing flags for the current block. A set of current palettes corresponding to the set of color components is generated according to said one or more palette sharing flags. If a first palette sharing flag is asserted, one or more current palettes indicated by the first palette sharing flag are copied entirely from one or more reference palettes of a set of reference palettes. If the first palette sharing flag is not asserted, one or more current palettes indicated by the first palette sharing flag are derived from a bitstream associated with the video data. Encoding or decoding is then applied to the current block according to the set of current palettes. The current block corresponds to a coding unit (CU), a prediction unit (PU), a largest coding unit (LCU) or a coding tree block (CTB).

One aspect of the present invention addresses palette sharing flag design. The palette sharing flags may correspond to a single sharing flag and if the single sharing flag is asserted, all current palettes of the set of current palettes are copied entirely from all reference palettes of the set of reference palettes. Each of said one or more palette sharing flags may correspond to each of the set of color components, and if one corresponding sharing flag is asserted, one corresponding current palette with one corresponding color component is copied entirely from one corresponding reference palette with said one corresponding color component. The palette sharing flags may also correspond to a set of sharing flags for the color components (YUV, RGB, etc.). For example, the palette sharing flags may correspond to a luma palette sharing flag and a chroma palette sharing flag, and if the luma palette sharing flag or the chroma palette sharing flag is asserted, a current luma palette or at least one current chroma palette is copied entirely from one corresponding luma reference palette or at least one corresponding chroma reference palette.

Another aspect of the present invention addresses reference palette design. The set of reference palettes corresponds to a most recent set of palettes among one or more recent sets of palettes associated with one or more previous blocks. The one or more recent sets of palettes associated with one or more previous blocks are referred as "palette book" in this disclosure. The one or more recent sets of palettes may correspond to N recent sets of palettes, wherein N is an integer greater than zero. The palette book can be updated by deleting an oldest set of palettes when a new set of palettes is stored. In one embodiment, there is only one recent set of palettes in the palette book, i.e., N=1.

The set of reference palettes may also be shared from the above CU and/or the left CU. When the palette sharing flag is asserted and both the above CU and the left CU are allowed, an additional flag is used to indicate whether the set of palettes is shared from the above CU or the left CU. In one embodiment, the set of palettes of the above CU is compared with the set of palettes of the left CU. If they are identical, the additional flag can be skipped. Alternatively, a set of replacement palettes can be used to replace the identical set of palettes. The set of replacement palettes may correspond to the set of palettes of the above-left CU or the above-right CU. The set of replacement palettes may also be determined from a previously coded set of palettes.

BRIEF DESCRIPTION OF THE DRAWINGS

FIG. 1 illustrates a flowchart of an exemplary system incorporating an embodiment of the present invention to share palette from previously processed palette based on one or more palette sharing flags.

DETAILED DESCRIPTION OF THE INVENTION

In order to improve the performance and to reduce the complexity of palette coding, the present invention discloses various improvements and simplified palette coding. In first category embodiments of the present invention, the palette is predicted or shared on a component-by-component or CU-by-CU basis using the left and/or the above CU. When the palette prediction is applied to coding units (CUs) in a raster scan fashion (i.e., row-by-row and from top row to bottom row), the above CU and the left CU represent previously processed CUs. The CU-by-CU based palette sharing can be applied to the triplet palette format as disclosed in JCTVC-N-0249. In second category embodiments of the present invention, the prediction and sharing is accomplished by facilitating a history of previous coded palettes using "palette book". In this case, the palettes to be shared may be associated with CUs other than the above CU or the left CU. For example, a most recently coded palette can be saved within a given LCU (or so called coding tree unit, CTU), or within a given region of multiple LCUs (CTUs) such as CTU lines, or within the current slice. A CU within the current LCU (or, within a given region of multiple LCUs (CTUs) such as CTU lines, or within the current slice) can either share this palette or uses its own (new) palette.

First Embodiment: Component-wise control of palette sharing from left/above CU. In this embodiment, the palette or palettes for the current CU can share with the palette or palettes from the above CU or the left CU, and the palette sharing is performed for each color component. An indication (e.g., palette_pred[color_index]) for each color component can be used to indicate whether palette prediction is used. If palette prediction is used, another indication can be used to indicate whether the prediction is from the above CU or the left CU. For example, an indication pred_from_above can be used. If pred_from_above has a value of 1, palette prediction from the above CU is selected. Otherwise, palette prediction is from the left CU. An exemplary pseudo code according to this embodiment is shown below.

---

For (color_index)
  If (palette_pred[color_index])
    If (pred_from_above[color_index])

-continued

```
        All element current CU palette[color_index] = Above CU
            palette[color_index]
    Else
        All element Current CU palette[color_index] = Left CU
            palette[color_index]
        End
    Else
        Parse syntax num_major_color[color_index]
        For (n <= num_major_color[color_index])
            Parse syntax for current CU palette[color_index][n]
        End
    End
End
```

In the above exemplary pseudo code, when palette_pred [color_index] indicates that palette prediction is used for the specified color component (indicated by color_index), an entire palette including the palette size of the specified color component with color_index is copied from palette of the above block or the left block. In the above exemplary pseudo code, when palette_pred[color_index] indicates that palette prediction is not used, a new palette for the current CU (i.e., Parse syntax num_major_color[color_index]) is derived from the bitstream.

Second Embodiment: CU-wise control of palette sharing from left/above CU. Compared to the first embodiment, the control for whether to share the palette for the current CU is the same for all color_index. In other words, the control flags, palette_pred and pred_from_above are the same for all color_index. An exemplary pseudo code according to this embodiment is shown below.

```
If (palette_pred)
    If (pred_from_above)
        For (color_index)
            All element current CU palette[color_index] = Above CU
                palette[color_index]
        End
    Else
        For (color_index)
            All element Current CU palette[color_index] = Left CU
                palette[color_index]
        End
    End
Else
    For (color_index)
        Parse syntax num_major_color[color_index]
        For (n <= num_major_color[color_index])
            Parse syntax for current CU palette[color_index][n]
        End
    End
End
```

Again, in the above pseudo code, when palette_pred indicates that palette prediction is used, entire palettes including the palette size for all color_index are copied from corresponding palettes of the above block or the left block.

Third Embodiment: Luma/Chroma-wise control of palette sharing from left/above CU. This embodiment may be considered as an example of component-wise palette sharing control, where the color components correspond to a luma component and at least one chroma component. In one example, palette sharing from above/left has two prediction control flags, where one flag is for luma and another is for chroma components. This can be particularly useful for contents with different degree of variations in the luma and chroma components. An exemplary pseudo code according to this embodiment is shown below for YUV color components.

```
If (palette_pred_Y)
    If (pred_from_above_Y)
        All element current CU palette[Y_index] =Above CU
            palette[Y_index]
    Else
        All element Current CU palette[Y_index] = Left CU
            palette[Y_index]
    End
Else
    Parse syntax num_major_color[Y_index]
    For (n <= num_major_color[Y_index])
        Parse syntax for current CU palette[Y_index][n]
    End
End
If (palette_pred_UV)
    If (pred_from_above_UV)
        All element current CU palette[U_index] =Above CU
            palette[U_index]
        All element current CU palette[V_index] =Above CU
            palette[V_index]
    Else
        All element Current CU palette[U_index] = Left CU
            palette[U_index]
        All element Current CU palette[V_index] = Left CU
            palette[V_index]
    End
Else
    Parse syntax num_major_color[U_index]
    For (n <= num_major_color[U_index])
        Parse syntax for current CU palette[U_index][n]
    End
    Parse syntax num_major_color[V_index]
    For (n <= num_major_color[V_index])
        Parse syntax for current CU palette[V_index][n]
    End
End
```

As shown in the pseudo code above, separate sharing control flags pred_from_above_Y and pred_from_above_UV are used. Also respective palette tables (i.e., palette[Y_index], palette[U_index] and palette[V_index]) are used for individual color components. While U and V color components share a same flag (i.e., palette_pred_UV), individual flags may be used for U and V color components. Again, in the above pseudo code, when palette_pred_Y or palette_pred_UV indicates that palette prediction is used, entire palette including the palette size for Y or U/V is copied from corresponding palette of the above block or the left block.

Note that the above pseudo-codes correspond to the decoding process. Similar pseudo codes can be developed for the encoder side. For example, the action at the encoder side corresponding to "Parse syntax num_major_color[color_index]" will be "Signal syntax num_major_color[color_index]". To reduce the line buffer associated with the shared palette from the above CU, a variation of the embodiments according to the present invention may allow the share-above only if the above CU is within the current largest CU (LCU) or coding tree unit (CTU). An encoder compliant to this variation of embodiments will check whether the above CU and the current CU are in the same LCU or CTU. While the examples shown above always allow both the above CU and the left CU for the current CU to share the palette, however, it may also restrict to share the palette from only one neighboring CU (i.e., only the above CU or only the left CU). Furthermore, while the examples demonstrate that the granularity of palette coding and sharing is on a CU basis, other granularity of palette coding and sharing may be used as well. For example, palette coding and sharing can be performed on (prediction unit) PU basis, LCU basis, coding tree unit (CTU) basis, or multiple LCUs basis.

One example for the syntax signaling of the above embodiments is illustrated in the Table 1. The signaling bits can be context-coded. For the component-wise palette sharing in the first embodiment, the syntax bit in Table 1 for each color component can use different context for CABAC coding, or use the same context. Similarly different context can be used for luma/chroma control scheme in the third embodiment.

TABLE 1

|  | Signaling bit | palette_pred | pred_from_above |
|---|---|---|---|
| New palette | 0 | 0 | N/A |
| Share above | 10 | 1 | 0 |
| Share left | 11 | 1 | 1 |

For the second-category embodiments, a palette book is used. Various means can be used to generate the palette book. For example, a history of the recently encoded palette sets can be stored in a "palette book". The current CU may choose to share one of the palette sets stored in the palette book as indicated by book_index. The current CU may also use its own palette and the current palette will replace one set in the palette book. The new palette is encoded and transmitted to the decoder so that the same palette book updating process can be carried out in the same way at both the encoder and the decoder. There are various ways to update and order the previously coded palette sets.

Fourth Embodiment: CU-wise control of palette sharing using "palette book". In one particular example, the palette sets are simply ordered based on their coding order, i.e. the most recently coded palette is stored at the beginning of the "palette book" (i.e., having a smallest index), while the older ones are stored afterwards (i.e., having larger indices). For example, a palette book with size KK is used to store KK sets of previously coded palettes. When a new palette set is being coded, entries 1 to (KK−1) in the "palette book" will be moved to entries 2 through KK in order to make the first entry available for the newly coded palette. This is simply a first-in-first-out updating and ordering process. The following pseudo-code demonstrates an example of palette sharing using a palette book when the sharing is controlled on a CU-wise basis (i.e., sharing for all color components). The embodiment may also be used for triplet palette format as disclosed in JCTVC-N-0249.

```
If (palette_pred)
    Parse syntax book_index
    For (color_index)
        Current CU palette[color_index] =
        palette_book[book_index][color_index]
    End
Else
    For (color_index)
        Parse syntax num_major_color[color_index]
        For (k<=KK, k>1, k−−)
            palette_book[k][color_index] =
            palette_book[k−1][color_index]
        End
        For (n <= num_major_color[color_index])
            Parse syntax for current CU palette[color_index][n]
            palette_book[0][color_index][n] = current CU
            palette[color_index][n]
        End
    End
End
```

In the above pseudo code, when the palette prediction is used as indicated by palette_pred being 1, a palette book index (i.e., book_index) is determined from the bitstream. The palette for the current CU (i.e., Current CU palette [color_index]) is derived from the palette book having book_index (i.e., palette_book[book_index][color_index]). If the current CU does not use palette prediction, entries 1 to (KK−1) in the "palette_book" will be moved to entries 2 through KK in order to make the first entry available for the newly coded palette (i.e., palette_book[k][color_index]=palette_book[k−1][color_index] for (k<=KK, k>1, k−−)). The newly parsed current CU palette (i.e., Parse syntax for current CU palette[color_index][n]) will be placed in the leading palette_book (i.e., palette_book[0][color_index] [n]=current CU palette[color_index][n]).

Fifth Embodiment: Component-wise control of palette sharing using "palette book". The fifth embodiment is similar to the fourth embodiment except that the sharing control is component-wise. An exemplary pseudo code according to this embodiment is shown below for each color component.

```
For (color_index)
    If (palette_pred[color_index])
        Parse syntax book_index[color_index]
        palette[color_index] =
        palette_book[ book_index[color_index] ][color_index]
    Else
        Parse syntax num_major_color[color_index]
        For (k<=KK, k>1, k−−)
            palette_book[k][color_index] =
            palette_book[k−1][color_index]
        End
        For (n <= num_major_color[color_index])
            Parse syntax for current CU palette[color_index][n]
            palette_book[0][color_index][n] = current CU
            palette[color_index][n]
        End
    End
End
```

Sixth Embodiment: Luma/Chroma-wise control of palette sharing using "palette book". While CU-wise and component-wise palette sharing control using "palette book" are shown in the fourth and fifth embodiments respectively, the sharing control of palette book may also be luma/chroma wise. The luma component and the chroma components may have separate sharing controls (e.g., one control flag for luma and one control flag for chroma). Each luma and chroma components may have its own palette table. This may be particularly useful for content with different degree of variations in the luma and chroma components. An exemplary pseudo code according to this embodiment is shown below for YUV color format, where a same sharing control flag is for the U and V component (i.e., palette_pred_UV), separate control flags may also be used.

```
If (palette_pred_Y)
Parse syntax book_index_Y
    Current CU palette[Y_index] =
    palette_book[book_index_Y][Y_index]
Else
    Parse syntax num_major_color[Y_index]
    For (k<=KK, k>1, k−−)
        palette_book[k][Y_index] = palette_book[k−1][ Y_index]
    End
    For (n <= num_major_color[Y_index])
        Parse syntax for current CU palette[Y_index][n]
        palette_book[0][Y_index][n] = current CU palette[Y_index][n]
    End
End
If (palette_pred_UV)
Parse syntax book_index_UV
```

```
Current CU palette[U_index] =
palette_book[book_index_UV][U_index]
Current CU palette[V_index] =
palette_book[book_index_UV][V_index]
Else
   Parse syntax num_major_color[U_index]
   For (k<=KK, k>1, k--)
       palette_book[k][U_index] = palette_book[k-1][U_index]
   End
   For (n <= num_major_color[U_index])
       Parse syntax for current CU palette[U_index][n]
       palette_book[0][U_index][n] = current CU palette[U_index][n]
   End
   Parse syntax num_major_color[V_index]
   For (k<=KK, k>1, k--)
       palette_book[k][V_index] = palette_book[k-1][V_index]
   End
   For (n <= num_major_color[V_index])
       Parse syntax for current CU palette[V_index][n]
       palette_book[0][U_index][n] = current CU palette[V_index][n]
   End
End
```

While the examples shown above always allow both the above CU and the left CU for the current CU to share their palette. However, it may also restrict to allow only one neighboring CU (only above CU or only left CU) to share the palette. Furthermore, while the examples demonstrate the granularity of palette coding and sharing on a CU basis, other granularity of palette coding and sharing may be used as well. For example, palette coding and sharing can be performed on prediction unit (PU) basis, largest coding unit (LCU) basis, coding tree unit (CTU) basis, or multiple LCUs basis.

While the first-in-first-out scheme is used in the pseudo codes for the fourth embodiment through the sixth embodiment for the "palette book" updating and ordering, other method can also be utilized as long as the encoder and decoder can perform the same process. For example, a counter can be used to keep track of the frequency of each palette set being selected for sharing. The palette book can then be updated according to the frequency, such as ordering them from high selection frequency to low selection frequency.

The selection of an entry from the "palette book" has to be signaled in the bitstream. The most straightforward way is to signal the book entry with fixed length coding. However, with proper ordering of the "palette book", such as first-in-first-out or frequency-based, the most likely to be used palette entries are in the front of the "palette book". On the other hand, entries at the end of the "palette book" are less likely to be used. Thus, a more efficient syntax design can be constructed to exploit such property. For example, the selection of entry 0, 1, 2, 3 for a "palette book" with size 4 can be signaled using the variable length code as shown in Table 2.

TABLE 2

| book_index | fixed length | variable length |
|---|---|---|
| 0 | 00 | 0 |
| 1 | 01 | 10 |
| 2 | 10 | 110 |
| 3 | 11 | 111 |

The signaling bits of the variable length code can be context-coded. For the component-wise palette sharing in the fifth embodiment, the syntax bit in Table 2 for each color component can use different context for CABAC (context adaptive binary arithmetic coding), or they can use the same context. Similarly different context can be used for luma/chroma control scheme in the sixth embodiment.

Since the "palette book" keeps track and updates the most recently coded palette sets, there is no line buffer issue. The selection of palette book size becomes an issue of tradeoff between providing better palette matching (i.e., using larger book size) and signaling side information (i.e., using smaller book size).

Another design consideration is the duration of the palette to be kept valid before it is being reset. Longer valid duration, for example the entire slice/picture, enables longer memory of the palette to be available for the block. However, the error resilience property becomes weaker, as loss of such palette book will affect the decoding of all blocks in the slice/picture.

Seventh Embodiment: CU-wise control of palette sharing using "palette book" with palette book size kk=1. This embodiment corresponds to a particular example of the palette book sharing, where only one most recently coded palette is kept in the book (i.e., palette book size kk=1). Since there is only 1 entry in the palette book, there is no need to signal the book_index as mentioned in embodiments 4-6. Also, the updating process for the palette book becomes simply replacing the palette book with the current palette table. An exemplary corresponding pseudo-code for CU-wise control of palette sharing using "palette book" with palette book size kk=1 and various valid durations is shown below, where the valid duration defines how often the book will be reset.

```
If (begin new LCU, or begin new LCU row, or begin new slice)
   Clear palette_book
End
If (palette_pred)
   For (color_index)
       Current CU palette[color_index] = palette_book[color_index]
   End
Else
   For (color_index)
       Parse syntax num_major_color[color_index]
       For (n <= num_major_color[color_index])
           Parse syntax for current CU palette[color_index][n]
           palette_book[color_index][n] = current CU
           palette[color_index][n]
       End
   End
End
```

As shown in the above example, there is no need for shifting the old palette book to make room for the new one. The palette book is reset at the beginning of each LCU, LCU row, or slice as shown in the pseudo code (i.e., "If (begin new LCU, or begin new LCU row, or begin new slice), Clear palette_book").

Eighth Embodiment: Component-wise control of palette sharing using "palette book" with palette book size kk=1. An exemplary corresponding pseudo-code for component-wise control of palette sharing using "palette book" with palette book size kk=1 and various valid durations is shown below.

```
If (begin new LCU, or begin new LCU row, or begin new slice)
   Clear palette_book
End
For (color_index)
   If (palette_pred[color_index])
       Current CU palette[color_index] = palette_book[color_index]
```

```
    Else
        Parse syntax num_major_color[color_index]
        For (n <= num_major_color[color_index])
            Parse syntax for current CU palette[color_index][n]
            palette_book[color_index][n] = current CU
            palette[color_index][n]
        End
    End
End
```

Ninth Embodiment: Luma/chroma-wise control of palette sharing using "palette book" with palette book size kk=1. An exemplary corresponding pseudo-code for Luma/chroma-wise control of palette sharing using "palette book" with palette book size kk=1 and various valid durations is shown below.

```
If (begin new LCU, or begin new LCU row, or begin new slice)
    Clear palette_book
End
If (palette_pred_Y)
    Current CU palette[Y_index] = palette_book[Y_index]
Else
    Parse syntax num_major_color[Y_index]
    For (n <= num_major_color[Y_index])
        Parse syntax for current CU palette[Y_index][n]
        palette_book[Y_index][n] = current CU palette[Y_index][n]
    End
End
If (palette_pred_UV)
    Current CU palette[U_index] = palette_book[U_index]
    Current CU palette[V_index] = palette_book[V_index]
Else
    Parse syntax num_major_color[U_index]
    For (n <= num_major_color[U_index])
        Parse syntax for current CU palette[U_index][n]
        palette_book[U_index][n] = current CU palette[U_index][n]
    End
    Parse syntax num_major_color[V_index]
    For (n <= num_major_color[V_index])
        Parse syntax for current CU palette[V_index][n]
        palette_book[V_index][n] = current CU palette[V_index][n]
    End
End
```

Another aspect of the present invention is related to syntax of palette prediction. A pseudo code for parsing the syntax associates with the signaling of palette sharing in Table 1 is illustrated as follows.

```
Parse syntax palette_pred
If (palette_pred)
    Parse syntax pred_from_above
    If (pred_from_above)
        Current palette is copied from the above palette
    Else
        Current palette is copied from the left palette
    End
Else
    Parse syntax of the current block's palette
End
```

Another aspect of the present invention addresses the case of identical palette from the above CU and the left CU when palette sharing is from the above CU and the left CU. The pseudo codes shown above illustrates that syntax palette_pred is first parsed. If palette_pred has a value of 1, then syntax pred_from_above is parsed. Depending on the value of pred_from_above, the palette for the current CU is copied from either above or left.

Tenth Embodiment: Omitting syntax pred_from_above when the above and left palettes are identical. According to this embodiment, in the event that the above palette is the same as the left palette, there is no need to differentiate whether to copy from above or left when palette_pred has a value of 1. Accordingly, the syntax pred_from_above becomes redundant in this case. In order to remove this redundancy, this embodiment checks whether the above palette is the same as the left palette. If so, the pred_from_above is not transmitted. An exemplary pseudo-code for incorporating a comparison and indication regarding whether the above palette is the same as the left palette is shown below.

```
AbLfEq = (above palette = = left palette)
Parse syntax palette_pred
If (palette_pred)
    If (!AbLfEq)
        Parse syntax pred_from_above
        If (pred_from_above)
            Current palette is copied from the above palette
        Else
            Current palette is copied from the left palette
        End
    Else
        Current palette is copied from the above palette
    End
Else
    Parse syntax of the current block's palette
End
```

As shown in the above pseudo code, the above palette and the left palette are compared (i.e., AbLfEq=(above palette==left palette)). If the above palette and the left palette are not the same (i.e., !AbLfEq having a value of 1), regular palette sharing from the above or the left is performed. Otherwise (i.e., !AbLfEq having a value of 0), no syntax for pred_from_above is parsed and the current palette is always copied from the above palette. Alternatively, the current palette is always copied from the left palette since the above palette and the left palette are the same.

Eleventh Embodiment: Using replacement neighboring palette when the above and left palettes are identical. While the tenth embodiment omits the syntax pred_from_above when the left palette is identical to the above palette, this embodiment uses other causal palette from a neighboring block to replace either the above or the left palette. The possible causal neighboring blocks can be, for example, the above-left block or the above-right block. For example, the palette from the above-left block can be used to replace the left palette. An exemplary pseudo-code to use a replacement palette from another neighboring block when the above palette is identical to the left palette is shown below.

```
AbLfEq = (above palette = = left palette)
Parse syntax palette_pred
If (palette_pred)
    Parse syntax pred_from_above
    If (pred_from_above)
        Current palette is copied from the above palette
    Else
        If (!AbLfEq)
            Current palette is copied from the left palette
        Else
            Current palette is copied from the above-left palette
        End
    End
Else
    Parse syntax of current block's palette
End
```

Twelveth Embodiment: Using a previously coded palette when the above and left palettes are identical. This embodiment maintains a previously coded palette. For example, the previously coded palette may correspond to the most recent coded palette that is neither the above nor the left palette of the current block. This previously coded palette can be utilized for palette sharing when the above and left palettes of the current block are the same. This approach requires an updating process at both the encoder and the decoder to maintain a previously coded palette. An exemplary pseudo-code to use a previously coded palette when the above palette is identical to the left palette is shown below.

```
AbLfEq = (above palette = = left palette)
Parse syntax palette_pred
If (palette_pred)
    Parse syntax pred_from_above
    If (pred_from_above)
        Current palette is copied from the above palette
    Else
        If (!AbLfEq)
            Current palette is copied from the left palette
        Else
            Current palette is copied from the "recent palette"
        End
    End
Else
    Parse syntax of current block's palette
End
```

In the above exemplary pseudo code, the most recent coded palette is denoted as "recent palette". The most recent palette is used as an example that can be used to replace the above or left block's palette. Other palette maintaining approaches can also be used.

The performance of an embodiment incorporating the seventh embodiment is compared to an anchor system disclosed in JCTVC-P0108 (Guo et al, *RCE4: Test 1. Major-color-based screen content coding*, Joint Collaborative Team on Video Coding (JCT-VC) of ITU-T SG 16 WP 3 and ISO/IEC JTC 1/SC 29/WG 11, 16th Meeting: San José, US, 9-17 Jan. 2014, Document: JCTVC-P0108). The comparison is performed for various test materials as shown in the first column and for various system configurations (AI-MT, AI-HT and AI-SHT). The AI refers to "all Intra", MT refers to "Main Tier", HT refers to "High Tier" and SHT refers to "Super High Tier". The performance measure is based on BD-rate, which is a well-known performance measure in the field of video coding. The comparison results are shown in Table 3, where a negative value in Table 3 implies performance improved over the anchor system. As shown in Table 3, the seventh embodiment of the present invention demonstrates noticeable performance improvement for screen content materials (e.g., SC RGB 444, SC YUV 444, SC(444) GBR Opt. and SC(444) YUV Opt.).

TABLE 3

|  | Configuration | | |
| --- | --- | --- | --- |
| Test material | AI-MT | AI-HT | AI-SHT |
| Class F | -1.4% | -1.2% | -1.1% |
| Class B | 0.0% | 0.0% | 0.0% |
| SC RGB 444 | -3.6% | -3.4% | -3.1% |
| Animation RGB 444 | 0.0% | 0.0% | 0.0% |
| SC YUV 444 | -4.0% | -4.1% | -3.9% |
| Animation YUV 444 | 0.0% | 0.0% | 0.0% |
| RangeExt | 0.0% | 0.0% | 0.0% |
| SC(444) GBR Opt. | -6.1% | -6.1% | -5.9% |
| SC(444) YUV Opt. | -7.8% | -8.6% | -8.7% |

FIG. 1 illustrates a flowchart of an exemplary system incorporating an embodiment of the present invention to share palette from previously processed palette based on one or more palette sharing flags. The system receives input data associated with a current block comprising a set of color components as shown in step 110, wherein the set of color components consists of one or more colors. For encoding, the input data corresponds to pixel data to be encoded using palette coding. For decoding, the input data corresponds to coded pixel data to be decoded using palette coding. The input data may be retrieved from memory (e.g., computer memory, buffer (RAM or DRAM) or other media) or from a processor. One or more palette sharing flags for the current block is determined as shown in step 120. The first palette sharing flag is checked to determine whether it is asserted. In step 130. If the result is "Yes", the processing goes to step 140. If the result is "No", the processing goes to step 150. After processing in step 140 or step 150, the processing goes to step 160. In step 140, the set of current palettes is generated by copying one or more current palettes indicated by the first palette sharing flag entirely from one or more reference palettes of a set of reference palettes. In step 150, the set of current palettes is generated by deriving said one or more current palettes indicated by the first palette sharing flag from a bitstream associated with the video data. In step 160, encoding or decoding is applied to the current block according to the set of current palettes.

The flowchart shown above is intended to illustrate an example of palette coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of coding a block of video data using palette coding in a video coding system, the method comprising:
   receiving input data associated with a current block of a block group, the current block comprising pixels represented based on a set of color components, the set of color components corresponding to one or more colors;
   in a case that the current block is at a beginning of the block group, clearing a stored set of reference palettes;
   determining one or more palette sharing flags for the current block;
   generating, by a processing circuit of the video coding system, a set of current palettes corresponding to the set of color components for the pixels of the current block according to the one or more palette sharing flags, including, for a first color component,
      in a case that a first palette sharing flag of the one or more palette sharing flags is asserted, generating a first current palette for the first color component of the current block to be the same as a reference palette of the stored set of reference palettes, and
      in a case that the first palette sharing flag of the one or more palette sharing flags is not asserted, generating the first current palette for the first color component of the current block based on the received input data;
   updating the stored set of reference palettes, which includes at most a predetermined number of reference palettes, based on the generated set of current palettes by performing at least
      adding the first current palette to the stored set of reference palettes, or
      adjusting an order of the reference palette in the stored set of reference palettes; and
   encoding or decoding, by the processing circuit of the video coding system, the current block according to the set of current palettes.

2. The method of claim 1, wherein the current block corresponds to a coding unit (CU) or a prediction unit (PU).

3. The method of claim 1, wherein
   the one or more palette sharing flags include only the first palette sharing flag, and
   the generating the set of current palettes includes setting current palettes of the set of current palettes to be the same as respective reference palettes of the stored set of reference palettes that are associated with a particular previously palette-coded block.

4. The method of claim 1, wherein each of the one or more palette sharing flags corresponds to respective one of the set of color components.

5. The method of claim 1, wherein the one or more palette sharing flags correspond to a luma palette sharing flag for a current luma palette and a chroma palette sharing flag for one or more current chroma palettes.

6. The method of claim 1, wherein the stored set of reference palettes includes one or more recently generated sets of palettes associated with one or more previous blocks.

7. The method of claim 6, wherein the one or more recently generated sets of palettes include N recently generated sets of palettes, N being an integer greater than zero.

8. The method of claim 7, wherein the updating the stored set of reference palettes based on the set of current palettes includes:
   removing an oldest set of palettes from the N recently generated sets of palettes; and
   adding the set of current palettes to the N recently generated sets of palettes.

9. The method of claim 1, wherein the stored set of reference palettes includes a first set of neighboring palettes associated with an upper side neighboring block or a second set of neighboring palettes associated with a left side neighboring block of the current block.

10. The method of claim 9, further comprising:
    in the case that the first palette sharing flag is asserted, determining a second palette sharing flag of the one or more palette sharing flags, the second palette sharing flag indicating a selected set of the first set of neighboring palettes and the second set of neighboring palettes.

11. The method of claim 10, wherein when the upper side neighboring block and the left side neighboring block of the current block have an identical set of palettes, the stored set of reference palettes includes the identical set of palettes and another previously coded set of palettes.

12. The method of claim 10, wherein when the upper side neighboring block and the left side neighboring block of the current block have an identical set of palettes, the stored set of reference palettes includes the identical set of palettes and a replacement set of palettes associated with an above-left neighboring block or an above-right neighboring block of the current block.

13. The method of claim 1, further comprising:
    in the case that the first palette sharing flag is asserted, determining a palette selection index indicating the reference palette of the stored set of reference palettes for generating the first current palette,
    wherein the palette selection index is context-coded.

14. The method of claim 1,
    wherein the predetermine number is two or more, and
    wherein
       the first current palette is added to the stored set of reference palettes in a first-in-first out manner, or
       the order of the reference palette in the stored set of reference palettes is adjusted in response to the first current palette being generated to be the same as the reference palette.

15. An apparatus of coding a block of video data using palette coding in a video coding system, the apparatus comprising one or more electronic circuits configured to:

receive input data associated with a current block of a block group, the current block comprising pixels represented based on a set of color components, the set of color components corresponding to one or more colors;

in a case that the current block is at a beginning of the block group, clear a stored set of reference palettes;

determine one or more palette sharing flags for the current block;

generate a set of current palettes corresponding to the set of color components for the pixels of the current block according to the one or more palette sharing flags, including, for a first color component, in a case that a first palette sharing flag of the one or more palette sharing flags is asserted, generating a first current palette for the first color component of the current block to be the same as a reference palette of the stored set of reference palettes, in a case that the first palette sharing flag of the one or more palette sharing flags is not asserted, generating the first current palette for the first color component of the current block based on the received input data;

update the stored set of reference palettes, which includes at most a predetermined number of reference palettes, based on the generated set of current palettes by performing at least adding the first current palette to the stored set of reference palettes, or adjusting an order of the reference palette in the stored set of reference palettes; and encode or decode the current block according to the set of current palettes.

16. The apparatus of claim 15, wherein the one or more palette sharing flags include only the first palette sharing flag, and the one or more electronic circuits are configured to set current palettes of the set of current palettes to be the same as respective reference palettes of the stored set of reference palettes that are associated with a particular previously palette-coded block.

17. The apparatus of claim 15, wherein each of the one or more palette sharing flags corresponds to respective one of the set of color components.

18. The apparatus of claim 15, wherein the stored set of reference palettes includes one or more recently generated sets of palettes associated with one or more previous blocks.

19. The apparatus of claim 18, wherein the one or more recently generated sets of palettes include N recently generated sets of palettes, N being an integer greater than zero.

20. The apparatus of claim 19, wherein the one or more electronic circuits are configured to:

remove an oldest set of palettes from the N recently generated sets of palettes; and add the set of current palettes to the N recently generated sets of palettes.

21. The apparatus of claim 15, wherein the stored set of reference palettes includes a first set of neighboring palettes associated with an upper side neighboring block or a second set of neighboring palettes associated with a left side neighboring block of the current block.

* * * * *